United States Patent [19]

Nakano et al.

[11] Patent Number: 5,109,342
[45] Date of Patent: Apr. 28, 1992

[54] CONSTANT-SPEED RUNNING APPARATUS WITH FAULT MONITORING FOR AUTOMOBILE

[75] Inventors: Shigeru Nakano; Yasuhiro Kondo, both of Osaka, Japan

[73] Assignee: Matsushita Electric Industrial Co., Ltd., Kadoma, Japan

[21] Appl. No.: 439,354
[22] PCT Filed: Jan. 26, 1989
[86] PCT No.: PCT/JP89/00071
§ 371 Date: Nov. 27, 1989
§ 102(e) Date: Nov. 27, 1989
[87] PCT Pub. No.: WO89/07059
PCT Pub. Date: Aug. 10, 1989

[30] Foreign Application Priority Data

Jan. 27, 1988 [JP] Japan .................... 63-16075

[51] Int. Cl.⁵ ............................................ B60K 31/00
[52] U.S. Cl. ........................ 364/426.04; 364/431.11; 371/62
[58] Field of Search .......... 364/426.04, 431.07, 364/431.11, 551.01; 180/170, 178, 179; 123/352, 349, 350, 361; 371/62, 16.3

[56] References Cited

U.S. PATENT DOCUMENTS

| | | | |
|---|---|---|---|
| 4,522,280 | 6/1985 | Blaney | 180/179 |
| 4,539,642 | 9/1985 | Mizuno et al. | 364/426.04 |
| 4,541,050 | 9/1985 | Honda et al. | 371/16.3 |
| 4,584,645 | 4/1986 | Kosak | 123/479 |
| 4,629,027 | 12/1986 | Shigenobu | 180/176 |
| 4,748,566 | 5/1988 | Sasaki et al. | 123/479 |
| 4,922,428 | 5/1990 | Takahashi | 364/426.04 |
| 4,924,397 | 5/1990 | Kurihara et al. | 180/179 |

FOREIGN PATENT DOCUMENTS 56-47374 11/1981 Japan .
62-160927 7/1987 Japan .
63-145136 6/1988 Japan .

OTHER PUBLICATIONS

Eugen Stall, "Konzepte fur sichere Elektronik in Kraftfahrzeugen", Automobil-Industrie, Jun. 1986, pp. 779-785.

*Primary Examiner*—Parshotam S. Lall
*Assistant Examiner*—Michael Zanelli
*Attorney, Agent, or Firm*—Cushman, Darby & Cushman

[57] ABSTRACT

A high-safety constant-speed running apparatus for an automobile which periodically provides an OFF signal for a small time having no effect on driving an actuator. The OFF signal is located in a signal controlling the actuator which is outputted from a micro-computer by a control signal OFF device. Presence or absence of this OFF signal is monitored by a control signal monitor, and when the OFF signal is not detected for a predetermined time or more a determination is made that the micro-computer is abnormal, which drives the actuator in the direction of closing a throttle valve through a throttle close control signal output, and thereby closes the throttle valve when the micro-computer is abnormal. This can reliably return the car to operating based on the driver's commands.

4 Claims, 7 Drawing Sheets

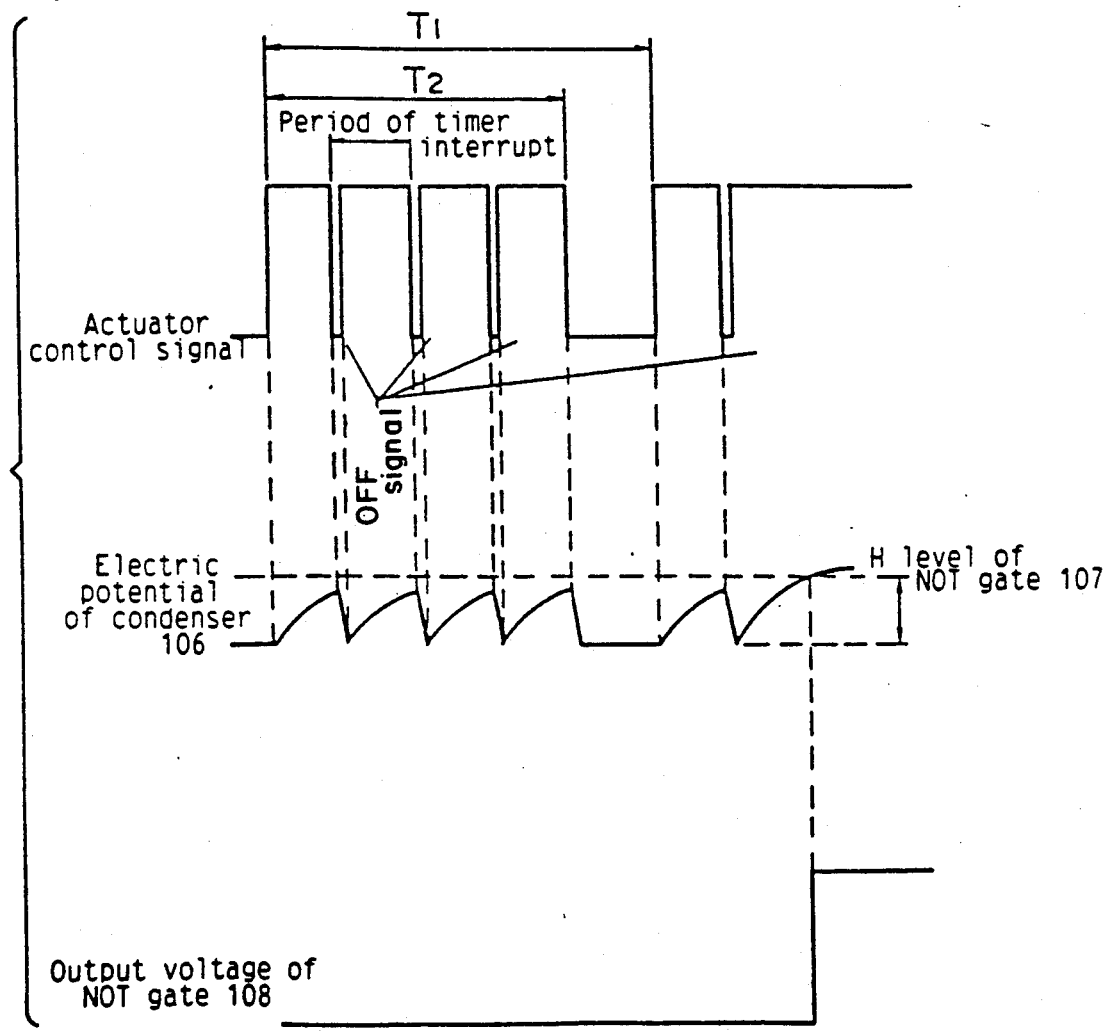

CONSTANT-SPEED RUNNING APPARATUS WITH FAULT MONITORING FOR AUTOMOBILE

TECHNICAL FIELD

The present invention relates to a constant-speed running apparatus for running an automobile at a car speed set by controlling opening and closing of a throttle valve by setting to a desired car speed during driving of the automobile, and specifically related to a constant-speed running apparatus for an automobile providing a control signal monitoring apparatus of an actuator for detecting an abnormal state of a controlling part of this apparatus.

BACKGROUND ART

A constant speed running apparatus for automobile performs automatic control to run an automobile at a set car speed. This constant-speed running apparatus for automobile is constituted principally with an actuator adjusting the degree of opening of a throttle valve, a controlling part and a driving part consisting of a micro computer which drives and controls this actuator and a running car speed detecting part, which adjusts the degree of opening of the throttle valve through the actuator, and adjusts fuel supplied to an engine, and controls the running car speed to become a set car speed. Such a conventional constant-speed running apparatus for an automobile usually includes an apparatus for preventing the controlling part from being put in an abnormal state of operation caused by static electricity or the like (watch dog timer. This device periodically sends a signal from the controlling part, and inputs this signal to a watch dog timer, and resets the microcomputer of the controlling part by the watch dog timer when the above-mentioned signal is not outputted for a predetermined time or more. The constant-speed running controlling state of the constant-speed running apparatus is cleared, and this thereby returns to the operation by the will of the driver.

However, there has been a problem that when only the portion transmitting a periodic signal of the controlling part is operated normally and an abnormal state takes place in the function performing a constant-speed running of the controlling part, the abnormal state cannot be detected by the above-mentioned constitution, and it is possible to fall into a state of dangerous operation.

DISCLOSURE OF THE INVENTION

A principal object of the present invention is to provide a high-safety constant-speed running apparatus for an automobile capable of reliably detecting an abnormal state of the controlling part by an economical constitution.

The above-mentioned object of the present invention can be achieved by the apparatus comprising an actuator which compares an arbitrarily set car speed with the actual car speed and adjusts the degree of opening of a throttle valve in a manner that the both speeds agree with each other, a driving output means for driving the above-mentioned actuator, an arithmetic operation means for operating the driving direction and the driving time of the above-mentioned actuator, a control signal output means for outputting a control signal of the actuator to the above-mentioned driving output means on the basis of the driving direction and the driving time of the actuator which are operated by the above-mentioned arithmetic operation means, a control signal OFF means for providing a periodic OFF signal for a minute time having no effect on driving the above-mentioned actuator in the above-mentioned control signal, and a control signal monitor means which monitors presence or absence of the above-mentioned OFF signal and judges that the above-mentioned arithmetic operation means or the above-mentioned controlling output means is abnormal when the OFF signal is not detected for a predetermined time or more to output a control abnormality signal. Furthermore, the above-mentioned object can be achieved by the apparatus comprising: an actuator for adjusting the degree of opening of a throttle valve; a driving output means for driving the above-mentioned actuator, an arithmetic operation means for operating the driving direction and the driving time of the actuator; a control signal output means for outputting a control signal to the above-mentioned driving output means through a throttle open control signal line for sending the control signal of the actuator when the throttle valve is opened and a throttle close control signal line for sending the control signal when the throttle valve is closed on the basis of the driving direction and the driving time of the actuator which are operated by the above-mentioned arithmetic operation means; a control signal OFF means for periodically providing an OFF time for a minute time to make no effect on driving the above-mentioned actuator in the above-mentioned control signal; a micro-computer having the above-mentioned arithmetic operation means, the above-mentioned control signal output means and the above-mentioned control signal OFF means; a NPN-type transistor the base of which is connected to the output of a NOT gate receiving the above-mentioned control signal through a resistor, the collector of which is connected to a control power supply through a resistor, and the emitter of which is connected to the ground of the control power supply; a control signal monitor means wherein one end of the above-mentioned resistor is connected to one end of a capacitor, and the other end of the above-mentioned resistor is connected to the ground of the control power supply and the input terminal of a NOT gate is connected to the connection part of the resistor and one end of the capacitor, and a circuit connecting two NOT gates in series is connected at least to the throttle open control signal line, and thereby, when the OFF signal of the above-mentioned control signal is not detected for a predetermined time or more, the output of the NOT gate rises to outputs the control abnormality signal; and a throttle close control signal output means which comprises of a thyristor the gate of which is connected to the output of the above-mentioned NOT gate through a first diode, the cathode of which is connected to the ground of the control power supply and is connected to the above-mentioned throttle open control signal line through second diode, and the anode of which is connected to a resistor through a third diode, a PNP-type transistor the base of which is connected to one end of a resistor connected to the third diode, the collector of which is connected to the throttle close control signal line, and the emitter of which is connected to the control power supply through a resistor and a resistor connecting the emitter and the base of the above-mentioned PNP-type transistor, whereby outputs a control signal driving the actuator in the direction of closing the throttle valve by the control abnormality signal from the above-mentioned control signal monitor means to said driving output means.

Then, the present invention can provide a safe constant-speed running apparatus which periodically provides an OFF signal for a minute time having no effect on driving the actuator in the signal for controlling the actuator, monitors presence or absence of this OFF signal, and when the OFF signal is not detected for a predetermined time or more, judges that the micro-computer of the controlling output means is abnormal, drives the actuator in the direction of closing the throttle valve, and thereby closes the throttle valve when the micro-computer is abnormal, and can return to running by accelerator-operation of the driver, and rewrites a RAM by timer interrupt processing, and only when rewrite of the RAM is confirmed by the main processing, outputs the OFF signal of the above-mentioned control signal, and thereby can detect an abnormal state of the micro-computer even when only the timer interrupt processing is operated normally in the state that processing of the micro-computer is not operated normally; and it further monitors presence or absence of the OFF signal of the above-mentioned control signal by a simple circuit constituted with a NOT gate, a transistor, a resistor, and a capacitor, and when the OFF signal is not detected for a predetermined time or more, outputs a control abnormality signal, receives the above-mentioned control abnormality signal by a simple circuit constituted with a thyristor, a diode, a resistor and a transistor, outputs the control signal driving the actuator in the direction of closing the throttle valve, and thereby can detect an abnormal state of the micro-computer by an economical constitution wherein only a simple circuit is added, and can avoid a dangerous state of driving caused by an abnormal state of the apparatus.

BRIEF DESCRIPTION OF THE DRAWINGS

FIG. 7 is a chart of an example of relationships between an OFF signal of an actuator control signal and the voltage of each part of a control signal monitor means.

THE BEST MODE FOR CARRYING OUT THE INVENTION

Description is made on a constant-speed running apparatus for automobile employing a control signal monitoring apparatus of an actuator of one embodiment of the present invention in reference to FIG. 1–FIG. 7.

Figure 1:
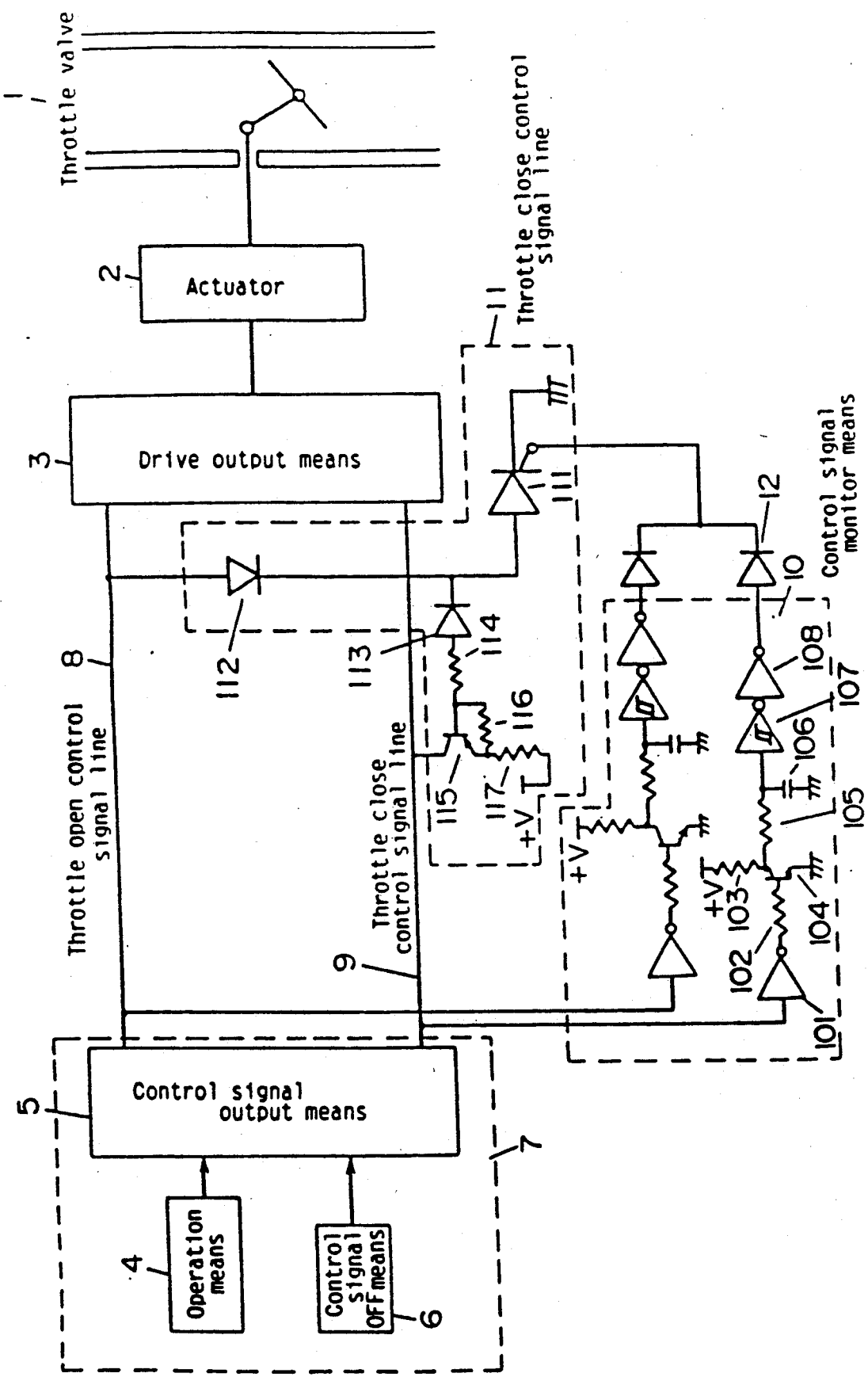
FIG. 1 is a whole constitution view of a constant-speed running apparatus for automobile in one embodiment of the present invention.

FIG. 1 is a whole constitution view of a constant-speed running apparatus in one embodiment of the present invention.

In FIG. 1 numeral 2 designates an actuator for adjusting the degree of opening of a throttle valve 1; numeral 3 designates a driving output means for driving the actuator 2; numeral 4 designates an arithmetic operation means for operating the driving direction and the driving time of the actuator 2; numeral 5 designates a control signal output means for outputting a control signal of the actuator to the driving output means through a throttle open control signal line 8 for sending a control signal when the throttle valve 1 is opened and a throttle close control signal line 9 when the throttle valve 1 is closed; numeral 6 designates a control signal OFF means for periodically providing an OFF signal for a minute time having no effect on driving the actuator 2; numeral 7 designates a micro-computer having the arithmetic operation means 4, the control signal output means 5 and the control signal OFF means 6; numeral 10 designates a control signal monitor means which is constituted in a manner that an NPN-type transistor 104 the base of which is connected to the output of a NOT gate 101 for receiving the control signal through a resistor 102, the collector of which is connected to a control power supply through a resistor 103 and the emitter of which is connected to the ground of the control power supply, a resistor 105 and a capacitor 106 are connected, the remaining end of the resistor 105 is connected to the collector of the above-mentioned transistor 104, the remaining end of the capacitor 106 is connected to the ground of the control power supply, the input terminal of a NOT gate 107 is connected to the connection part of the resistor 105 and the capacitor 106 respectively, and a circuit connecting the NOT gates 107 and 108 is series is connected to the throttle open control signal line 8 and the throttle close control signal line 9 respectively, and thereby the output of the NOT gate 108 rises when the OFF signal of the control signal is not detected for a predetermined time or more; numeral 11 designates a throttle close control signal output means which consists of a thyristor 111 the gate of which is connected to the output of the control signal monitor means 10 through a first diode 12, the cathode of which is connected to the ground of the control power supply, the anode of which is connected to the throttle open control signal line 8 through a second diode 112 and to a resistor 114 through a third diode 113 respectively, a PNP-type transistor 115 the base of which is connected to the remaining end of the resistor 114 connected to the third diode 113, the collector of which is connected to the throttle close control signal line 9 and the emitter of which is connected to the control power supply through a resistor 117, and a resistor 116 connecting the emitter and the base of the transistor 115, and outputs the control signal driving the actuator 2 in the direction of closing the throttle valve by a control abnormality signal from the control signal monitor means. And, with regard to the operation, description is made in a specific example as will be described next.

Figure 2:
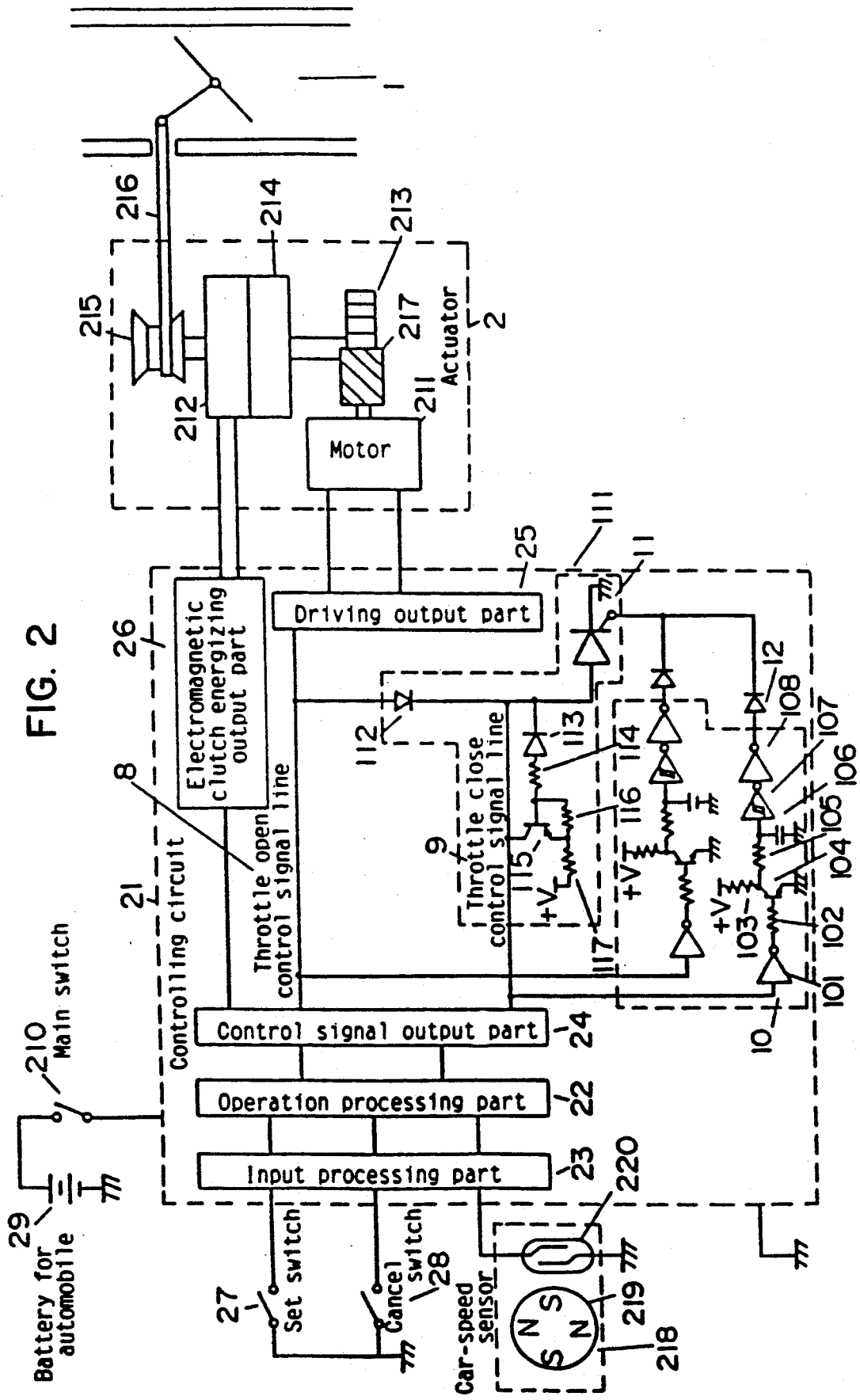
FIG. 2 is a constitution view showing one specific embodiment of FIG. 1.

FIG. 2 shows one specific embodiment, and numeral 21 designates a controlling circuit, which is constituted with: an input processing part 23 for processing the input signal of the micro-computer; an operation processing part 22 for performing arithmetic operation processing by a signal from the input processing part 23; a driving output part 25 for outputting a signal for controlling a motor 211 and an electromagnetic clutch 212 in the actuator 2; a control signal outputting part 24 for outputting a signal to an electromagnetic clutch energizing output part 26; the control signal monitor circuit 10 connected to the throttle open control signal line 8 and the throttle close control signal line 9 which send signals for controlling the motor 211; and a throttle close control signal outputting circuit 11 for driving the motor 212 in the direction of closing the throttle valve 1 by the control abnormality signal from the control signal monitor circuit 10 when the control signal becomes abnormal.

This controlling circuit 21 outputs four kinds of driving outputs of "open", "close" "hold" and "quickly close" to the actuator 2. The actuator 2 adjust the degree of opening of the throttle valve 1 by the output of the controlling circuit 21. The actuator 2 is constituted with the motor 211, the electromagnetic clutch 212, a worm gear 217 connected to the output shaft of the motor, a worm wheel 213 engaged with a gear box 214, the gear box 214 of a reduction mechanism which reduces rotation of a clutch plate fixed to and released from the electromagnetic clutch and the worm wheel 213, and transmits it to a bobbin 215 through the clutch plate, and the bobbin 215 winding up a cable 216 for driving the throttle valve 1.

When the throttle valve 1 is opened, the electromagnetic clutch energizing output part 26 receives a signal from the control signal outputting part 24 and energizes the electromagnetic clutch 212 to fix the clutch plate in the gear box 214 to the electromagnetic clutch 212; and rotation of the worm wheel 213 is transmitted to the bobbin 215; and the driving output part 25 receives a signal from the control signal outputting part 24 through the throttle open control signal line 8, and drives the motor 211 in the direction of opening the throttle valve 1. When the throttle valve 1 is closed, the electromagnetic clutch energizing output part 26 receives a signal from the control signal outputting part 24 and energizes the electromagnetic clutch 212; the driving output part 25 receives a signal through the throttle close control signal line, and drives the motor 211 in the direction of closing the throttle valve 1. Also, when the throttle valve 1 is held, the control signal outputting part 24 outputs a signal only to the electromagnetic clutch energizing output part 26, and energized the electromagnetic clutch 212 alone. Then, when the throttle valve 1 is quickly closed, the control signal outputting part 24 stops the output of the signal to the electromagnetic clutch energizing output part 26, and stops the energizing of the electromagnetic clutch 212; and the clutch plate in the gear box 214 is released from the electromagnetic clutch 212; and the bobbin 215 is also released from the reduction mechanism in the gear box 214; and the throttle valve 1 is closed quickly by a return spring of an accelerator pedal.

Numeral 27 designates a set switch, and by turning it to OFF from ON when a desired car speed is reached, constant speed running is started with the car speed at that time given as a set car speed. Numeral 28 designates a cancel switch, which is operated by an operation of a brake pedal or a clutch pedal, and sends a signal to the controlling circuit 21, stops the energizing of the electromagnetic clutch 212, and clears the constant-speed running.

Numeral 218 designates a car speed sensor, which consists of a rotary body 219 having four-pole magnetic poles which rotates in synchronism with the car shaft and a lead switch 220, and outputs four pulses per rotation of the rotary body 219

Numeral 29 designates a battery for an automobile, and numeral 210 designates a main switch of the constant-speed running apparatus, which is the power switch of the controlling circuit 21.

Numeral 10 designates the control signal monitoring circuit, which is connected to the throttle open control signal line 8 and the throttle close control signal line 9 respectively, and monitors that a signal for a minute time having no effect on driving the motor 211 is provided periodically in the signals passing through the respective signal lines; and when the OFF signal is not detected for a predetermined time or more during which the degree of opening of the throttle valve 1 is not changed quickly even when the motor 211 continues to be driven, outputs a control abnormality signal to the throttle close control signal output means 11.

Numeral 11 designates the throttle close control signal output means, which receives the control abnormality signal from the control signal monitoring circuit 10, outputs a signal to the throttle close control signal line, and drives the motor 211 in the direction of closing the throttle valve 1.

Figure 3:
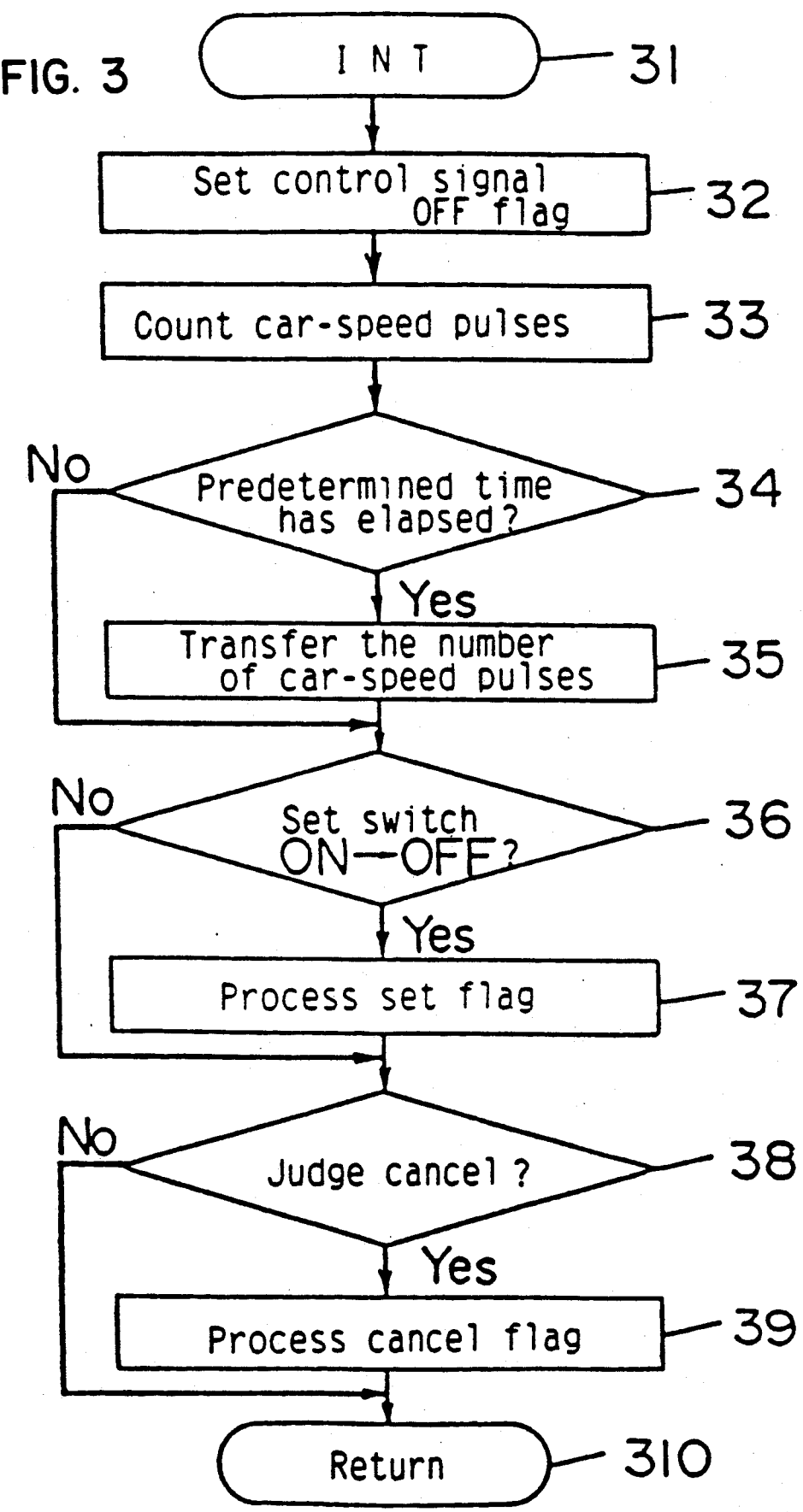
FIG. 3 is a flowchart showing operation of timer interrupt processing of a controlling circuit.
Figure 4:
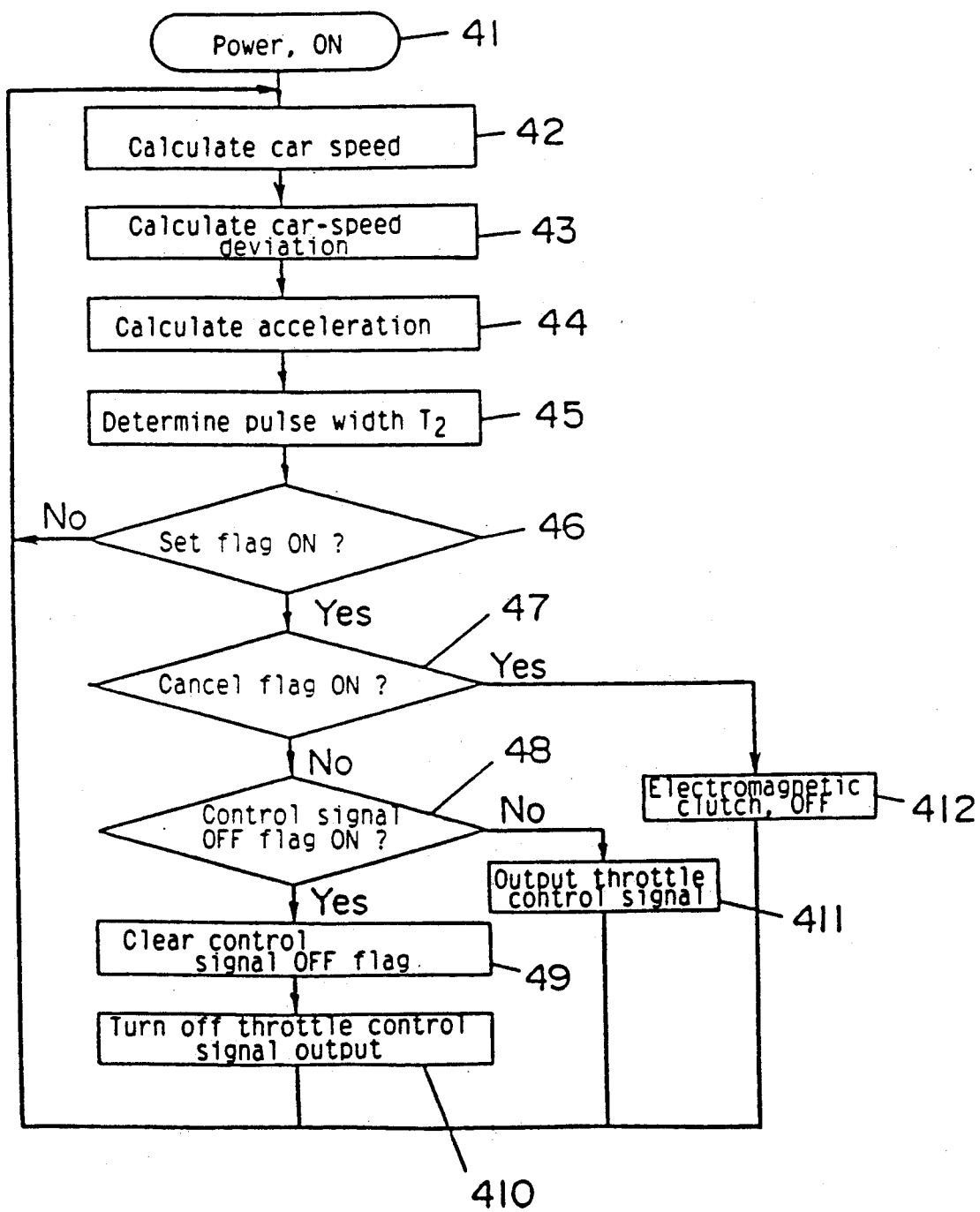
FIG. 4 is a flowchart showing operation of main processing of the controlling circuit.

FIG. 3 and FIG. 4 are flowcharts showing operation of the controlling circuit 21, and FIG. 3 shows timer interrupt processing, and FIG. 4 shows main processing.

FIG. 3 is a flowchart showing timer interrupt processing, and Step 31 is started by a timer interrupt of the micro-computer.

First, in Step 32, a control signal OFF flag is set, and permits the control signal driving the motor to provide the OFF signal.

Next, in Step 33, a change in the car-speed pulse is observed, and when a change is found in the car-speed pulses, the car-speed pulses are counted. Then, in Step 34, whether or not the predetermined time has elapsed is counted; and when the predetermined time has elapsed, in Step 35, the number of car-speed pulses counted within the predetermined time is transferred to a memory. When the predetermined time has not elapsed, processing proceeds to Step 36. Next, in Step 36, whether or not the set switch has changed from ON to OFF is checked; and when it has changed, a set flag is set in Step 37, and the car speed at that time is set as a set car speed, and constant-speed control is permitted. When it has not changed, processing proceeds to Step 38. Furthermore, in Step 38, the state of the cancel switch is checked; and when it is judged to be canceled, a cancel flag is set in Step 39, and the driving of the actuator is cleared, and the throttle valve 1 is closed quickly. When it is judged to be non-cancel, processing proceeds to Step 310, and returns to the main processing in FIG. 4.

FIG. 4 is a flowchart showing the main processing. When the main switch 210 as shown in FIG. 2 is turned off, the operation processing part 22 is started, and a program is executed from Step 41. First, in Step 42, the car speed is calculated from the number of car-speed pulses within the predetermined time counted in the timer interrupt, and thereafter in Step 43, the deviation from the set car speed set in Step 37 of time interrupt is calculated; and in Step 44, the difference between the car speed calculated the last time in Step 42 and the car speed calculated this time in Step 42 is calculated to be taken as an acceleration.

Figure 5:
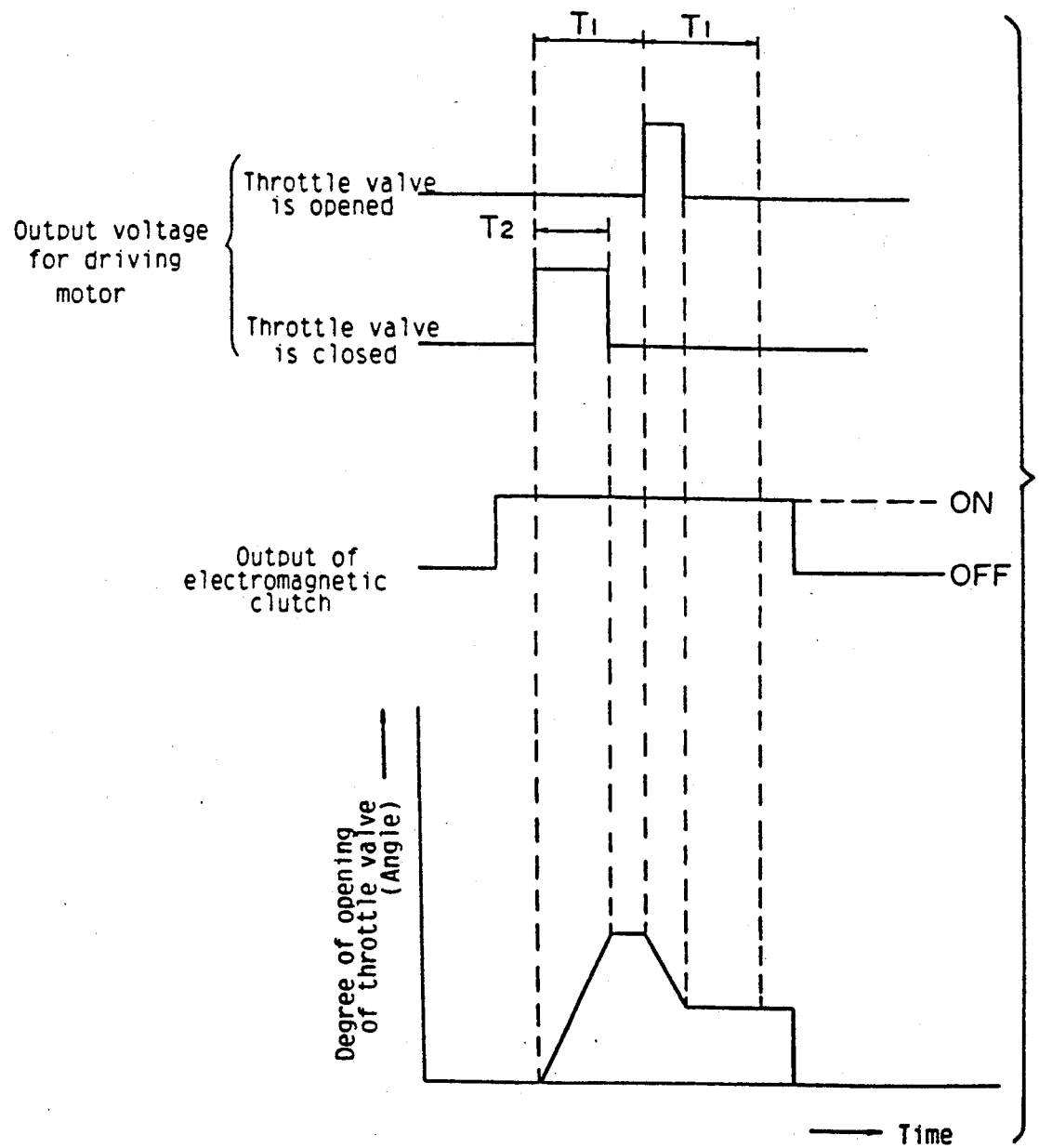
FIG. 5 is a view showing a relationship between the actuator driving output and the degree of opening of a throttle valve.

Next, in Step 45, a pulse width $T_2$ of the outer voltage driving the motor 211 is determined. The average value of the output voltage driving the motor 211 is changed by changing $T_2$ within a range of $$0 \leq T_2 \leq T_1$$

where, $T_1$ is a period of pulse of the output voltage, and thereby the rotating speed of the motor 211 is changed, and the amount of opening per unit time of the throttle valve 1 can be changed. FIG. 5 shows this aspect. The pulse width T₂ is determined by the following equation.

$$T_2 = A \Delta V + V \Delta \alpha$$

Figure 6:
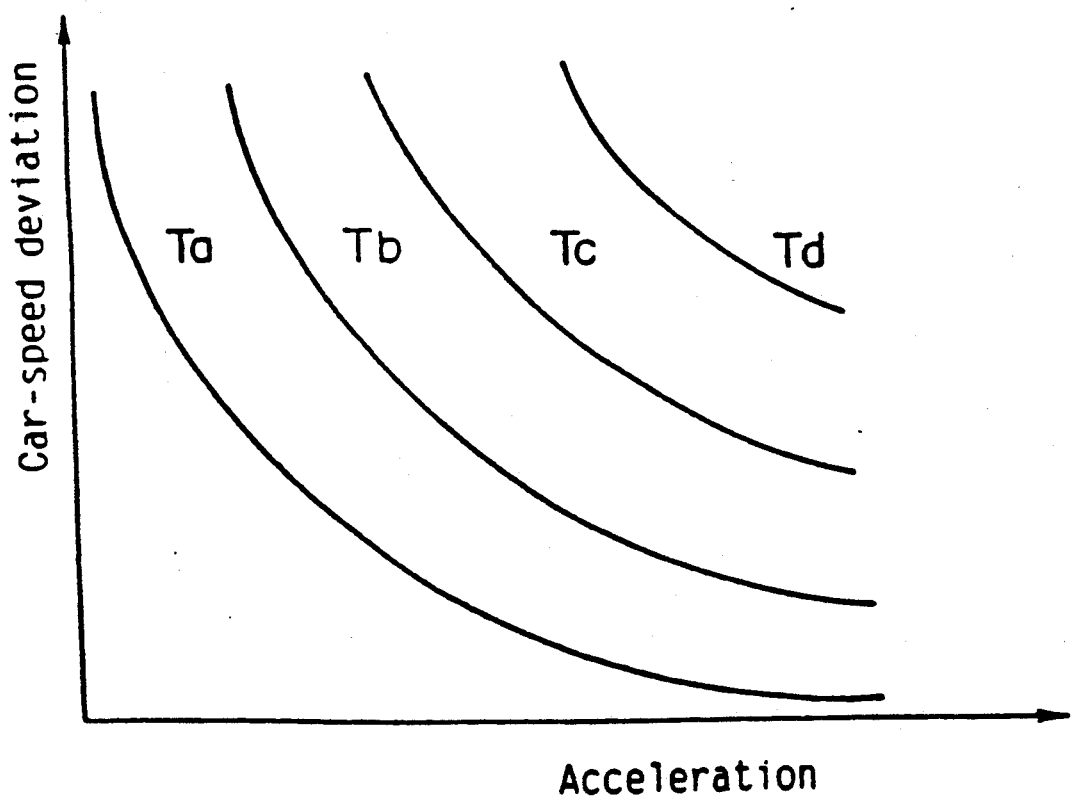
FIG. 6 is a view showing an example of relationships among the pulse width, the car-speed deviation and the acceleration.

Here, $\Delta V$ is a deviation of the actual car speed from the set car speed, A is a constant determined by the deviation of the actual car speed from the set car speed, and B is a constant determined by the difference between the car speed calculated this time and the car speed calculated the last time, and when the actual car speed > the set car speed, $\Delta A < 0$ holds; and when the acceleration is negative, $\Delta \alpha < 0$ holds; and the actuator is driven in the direction of opening the throttle valve 1 when $T_2 > 0$, and in the direction of opening the throttle valve 1 when $T_2 < 0$. This means that the pulse width $T_2$ is set by a function wherein the car speed deviation and the acceleration are variables. FIG. 6 shows an example of relationships among the pulse width, the car speed deviation and the acceleration.

In addition, with regard to the constants A and B the relation to $\Delta V$ and $\Delta \alpha$ can be arbitrarily changed depending on the actual car speed and each region wherein $\Delta V$ and $\Delta \alpha$ exist.

Next, in Step 36, the state of the set flag is checked, and when constant-speed running has been permitted, processing proceeds to Step 47, and when not permitted, processing returns to Step 42. In Step 47, the state of the cancel flag is checked, and when constant-speed running has not been inhibited, processing proceeds to Step 48, and when it has been inhibited, processing proceeds to Step 412. In Step 48, the state of control signal OFF flag is checked; and when the control signal OFF flag has not been set by a timer interrupt, processing proceeds to Step 411; and when it has been set, processing proceeds to Step 49. In Step 411, a control signal for driving the actuator is outputted. First, the control signal is outputted to the electromagnetic clutch energizing output part 26, and the electromagnetic clutch 212 is turned to ON, and the bobbin 215 is put in the rotated state by the output of the motor 211. When the result of calculation of the pulse width T₂ is positive, a signal is outputted as pulses of the pulse width T₂ and the period T₁ determined in Step 45 to the throttle close control signal line driving the motor 211 in the direction of closing the throttle valve 1, and the driving output part 25 applies a voltage of the polarity of rotating the motor 211 in the in the direction of closing the throttle valve 1; and in reverse, when T₂ is negative, a signal is outputted to the throttle valve open control signal line driving the motor in the direction of opening the throttle valve 1, and the driving output part 25 applies a voltage of the polarity of rotating the motor 211 in the direction of opening the throttle valve 1. In the case of T₂=0. the control signal to the electromagnetic clutch energizing part 26 is outputted, and the electromagnetic clutch 212 is turned to ON, but the degree of opening of the throttle valve is retained, and thereafter, processing returns to Step 42, since the control signal for driving the motor 211 is not outputted and hence the motor 211 is not driven, fixing the bobbin 215.

Where the constant-speed running has been inhibited in Step 47, in Step 412, the output of the control signal to the electromagnetic clutch energizing part 26 is stopped, and the electromagnetic clutch 2121 is turned to OFF, and the bobbin 215 is released from the interlock part of the motor 211, and the throttle valve 1 is closed quickly by the return spring of the accelerator pedal. Thereafter, processing returns to Step 42.

When the control signal OFF flag has been set in Step 48, processing proceeds to Step 49, clears the control signal OFF flag, and thereafter proceeds to Step 410; and when pulses of the pulse width T₂ are being outputted as the control signal driving the actuator, the output of the control signal is turned off. Thereafter, processing returns to Step 42. Thereby, the OFF signal for a minute time that makes no effect on driving the actuator can be provided in the control signal for driving the actuator, at the same period as the period of timer interrupt. Then, when this OFF signal is not outputted and hence the control signal is outputted the capacitor 106 of the control signal monitor means 10 is charged; and when the OFF signal is outputted the capacitor 106 is discharged. If the OFF signal is not outputted even after the period of timer interrupt has elapsed, the capacitor 106 continues to be charged; and when the electric potential of the capacitor 106 reaches the H level of the NOT gate 107 or higher, the output of the NOT gate 108 rises, and turns on the thyristor 111 of the throttle close control signal output means 11, and raises the throttle close control signal line 9, turns off the throttle open control signal line 8 and drives the actuator 2 in the direction of closing the throttle valve 1. An example of relationships among the OFF signal of the control signal driving this actuator, the electric potential of the capacitor 106 and the output of the NOT gate 108 is shown in FIG. 7.

In addition, in place of the thyristor employed in this embodiment, a switching IC, relay or the like may be employed.

Also, in this embodiment, description is made on the constant-speed running apparatus for automobile, but it is needless to say that this system can be applied also to actuator controlling circuits other than this apparatus.

As described above, according to the present invention, it is possible that the OFF signal for a minute time having no effect on driving the actuator is provided periodically in the control signal controlling the actuator, and presence or absence of this OFF signal is monitored, and when the OFF signal is not detected for a predetermined time or more, it is judged that the microcomputer is abnormal, and the actuator is driven in the direction of closing the throttle valve, and thereby the throttle valve is closed when the micro-computer becomes abnormal, and that, for the OFF signal of the above-mentioned control signal, by periodically providing the OFF signal in the signal for controlling the actuator using both of the main processing and the timer interrupt processing of software, the precision degree of detection of an abnormal state of the micro-computer is improved; and furthermore the monitoring circuit of the control signal of the actuator and the circuit for driving the actuator in the direction of closing the throttle valve when detecting a abnormal state of the micro-computer can be simply constituted.

In addition, in the automobile, to be put in the state that the speed rises (the throttle valve is opened) when the micro-computer goes abnormal being more dangerous than to be put in the state that the speed drops, and in view of simplifying the circuit the monitoring circuit of the throttle close control signal line may be omitted.

INDUSTRIAL APPLICABLITY

As detailed above, the present invention can provide a high-safety constant-speed running apparatus wherein the OFF signal for a minute time which makes no effect on driving of the actuator is periodically provided in the signal controlling the actuator, and presence or absence of this OFF signal is monitored, and when the OFF signal is not detected for a predetermined time or more, it is judged that the microcomputer is abnormal, and the actuator is driven in the direction of closing the throttle valve, and thereby the throttle valve is closed when the micro-computer goes abnormal, and makes the car return to the running by the accelerator operation of the driver.

Also, the present invention can provide a constant-speed running apparatus having a high precision in detecting an abnormal state of the micro-computer wherein the OFF signal of the above-mentioned control signal is rewritten to the RAM by timer interrupt processing, and is outputted only when it is made sure by the main processing that the RAM has been rewritten, and thereby an abnormal state of the microcomputer can be detected even when the main processing of the micro-computer is not operated normally and only the timer interrupt processing is operated normally.

Furthermore, the present invention can provide a constant-speed running apparatus which monitors presence or absence of the OFF signal of the above-mentioned control signal using a simple circuit constituted with a NOT gate, a transistor, a resistor and a capacitor, outputs the control abnormality signal when the OFF signal is not detected for a predetermined time or more receives the above-mentioned control abnormality signal by a simple circuit constituted with a thyristor, a diode, a resistor and a transistor, and outputs the control signal driving the actuator in the direction of closing the throttle valve, and thereby can avoid a risk of runaway caused by an abnormal state of the micro-computer at a low cost only by adding a simple circuit.

We claim:

1. In a constant-speed running apparatus for an automobile which compares an arbitrarily set car speed with an actual car speed and controls a degree of opening of a throttle valve through an actuator in a manner that both speeds agree with each other, the constant-speed running apparatus comprising:
   a driving output means for driving said actuator,
   an arithmetic operation means for operating a driving direction and a driving time of said actuator,
   a control signal output means for outputting a control signal for the actuator to said driving output means on the basis of the driving direction and the driving time of the actuator operated by said arithmetic operation means,
   a control signal OFF means for periodically providing an OFF signal into said control signal for a minute time which is short enough to have no effect on driving said actuator, and
   a control signal monitor means which monitors for said OFF signal in said control signal and judges that said arithmetic operation means or said control output means is abnormal when the OFF signal is not detected for a predetermined time or more, to output a control abnormality signal.

2. In a constant-speed running apparatus for an automobile which compares an arbitrarily set car speed with an actual car speed and controls a degree of opening of a throttle valve through an actuator in a manner that said speeds agree with each other, the constant-speed running apparatus comprising:
   a driving output means for driving said actuator;
   a microcomputer which operates a driving direction and a driving time of said actuator by outputting an appropriate control signal of the actuator to said driving output means, and which rewrites a RAM by timer interrupt processing, and when confirming by main processing that the RAM has been re-written, periodically provides an OFF signal into said control signal for a minute time which is short enough to have no effect on said actuator; and
   control signal monitor means which monitors for said OFF signal in said control signal, and when the OFF signal is not detected for at least a predetermined time, determining that the micro-computer is abnormal, and outputting a control abnormality signal.

3. In a constant-speed running apparatus for an automobile which compares an arbitrarily set car speed with an actual car speed, and controls a degree of opening of a throttle valve in a manner that said speeds agree with each other, said constant-speed running apparatus comprising:
   an actuator for adjusting a degree of opening of a throttle valve;
   a driving output means for driving said actuator;
   a micro-computer which operates a driving direction and a driving time of the actuator by outputting a control signal to said driving output means, said microcomputer sending the control signal of the actuator through a throttle open control signal line when said throttle valve is opened and sending the control signal through a throttle close control signal line when the throttle valve is closed, and for periodically providing an OFF signal within said control signal for a minute time which is short enough to make no effect on driving said actuator;
   an NPN-type transistor, a base of which is connected to the output of a first NOT gate receiving said control signal through a first resistor, a collector of which is connected to a control power supply through a second resistor and connected to one end of a third resistor, and an emitter of which is connected to a ground of the control power supply;
   control signal monitor means having an input connected to the other end of said third resistor comprising a first capacitor, said other end of said third resistor being connected to one end of said first capacitor, the other end of the first capacitor being connected to the ground of the control power supply,
   a second NOT gate having an input terminal which is connected to a connection part between the third resistor and said one end of the first capacitor,
   a third NOT gate in series with said second NOT gate, having an output which is connected at least to the throttle open control signal line, and thereby when the OFF signal of said control signal is not detected for a predetermined time, the output of said third NOT gate rises and outputs a control abnormality signal;
   a throttle close control signal output means which includes a thyristor having a gate which is connected to the output of said third NOT gate through a first diode, a cathode of which is connected to the ground of the control power supply, and an anode of which is connected to said throttle open control signal line through a second diode and is connected to one end of a fourth resistor through a third diode;

a PNP-type transistor, a base of which is connected to another end of said fourth resistor, a collector of which is connected to the throttle close control signal line, and an emitter of which is connected to the control power supply through a fifth resistor, and a sixth resistor for connecting the emitter and the base of said PNP-type transistor, so that said PNP transistor outputs the control signal for driving the actuator in the direction of closing the throttle valve by the control abnormality signal from said control signal monitor means to said driving output means.

4. A method of operating a constant-speed running apparatus for an automobile, comprising the steps of:

comparing an arbitrarily set car speed with an actual car speed;

controlling a degree of opening of a throttle valve through an actuator in a manner that both speeds agree with each other, by controlling a driving direction and a driving time of said actuator, and outputting a control signal for the actuator to said throttle valve on the basis of the driving direction and the driving time of the actuator;

periodically providing an OFF signal into said control signal for a minute time short enough to have no effect on driving said actuator; and monitoring for said OFF signal in said control signal and determining an abnormality when the OFF signal is not detected for a predetermined time, to output a control abnormality signal.

* * * * *